Figure 1:
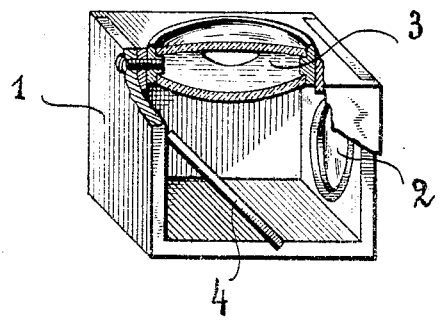

No. 782,333. PATENTED FEB. 14, 1905.
A. O. GRAF.
FINDER FOR CAMERAS.
APPLICATION FILED JUNE 15, 1904.

Witnesses
H. C. Prado
O. C. Ular

Adolf O. Graf Inventor
By Ralph Julian Sachers Attorney

No. 782,333.

Patented February 14, 1905.

UNITED STATES PATENT OFFICE.

ADOLF O. GRAF, OF NEW YORK, N. Y., ASSIGNOR TO THE SCIENTIFIC LENS COMPANY, OF NEW YORK, N. Y., A CORPORATION OF NEW YORK.

FINDER FOR CAMERAS.

SPECIFICATION forming part of Letters Patent No. 782,333, dated February 14, 1905.

Application filed June 15, 1904. Serial No. 212,695.

*To all whom it may concern:*

Be it known that I, ADOLF O. GRAF, a citizen of the United States, and a resident of New York, in the county of New York and State of New York, have invented certain new and useful Improvements in Finders for Cameras, of which the following is a specification.

The present invention relates to finders for cameras.

In photographic cameras heretofore in use special devices were provided for holding the camera in the horizontal plane, so as to prevent distorted pictures due to the fact that the sensitive surface was not entirely parallel to the main plane of the object to be photographed. Special devices were also used for viewing the object in monochrome, so as to be able to properly judge of the value of light and shadow.

The present invention has for its object to answer both of these purposes; and it consists, therefore, of the device illustrated in the drawings, in which—

Figure 2:
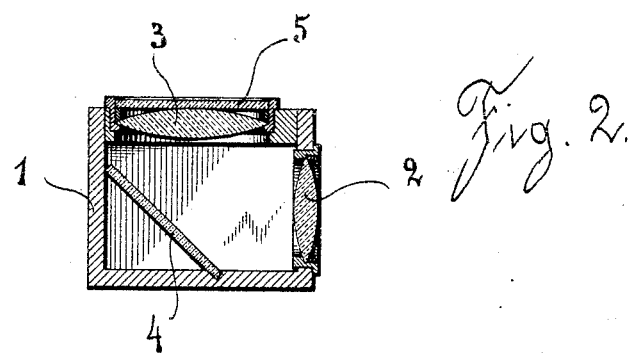
Figure 3:
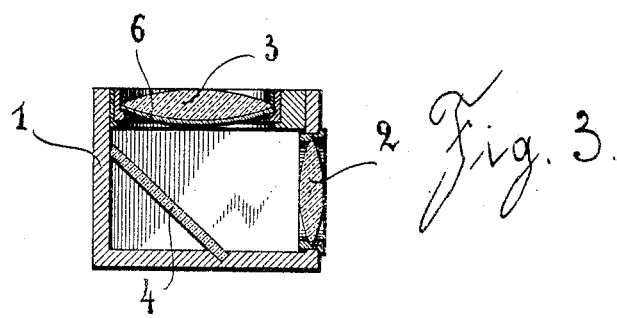

Figure 1 is a perspective side view of a finder constructed according to the present invention, and Figs. 2 and 3 are modifications thereof.

1 in all the figures is a casing made of metal or wood and secured to the photographic camera in the usual manner.

2 is the object-lens throwing the rays of light emanating from the object into the reflector or mirror 4, which reverses the image so produced, so that the viewing-lens 3 causes the image to be seen in its proper upright position.

The essence of the invention is to be found in the viewing-lens 3. Fig. 1 illustrates the same as a partially-filled liquid-lens acting like a spirit-level, and it is obvious that by holding the air-bubble in the center of the viewing-lens, which lens of course is held in the horizontal plane, the camera and the finder will be always in the proper relation to this horizontal plane.

Figs. 2 and 3 show finders for monochromatic viewing. 5 in Fig. 2 is a ray-screen of any desirable color causing the object seen through the finder to appear in monochrome. 6 in Fig. 3 being a colored coating or film on the lens proper answers the same purpose.

When the liquid-lens illustrated in Fig. 1 is filled with a transparent colored liquid, it will not only act as a means for indicating the relation of the position of the finder to the horizontal plane, but also as a ray or color screen for causing the picture seen through the finder to appear in only one color—*i. e.*, monochrome.

What is claimed as new and useful, and desired to be secured by Letters Patent of the United States, is—

1. The combination with a finder for cameras, of means adapted to cause the object to be seen in monochrome.

2. The combination with a finder for cameras, of a colored lens adapted to cause the object to be seen in monochrome.

3. The combination with a finder for cameras, of a liquid-lens adapted to cause the object to be seen in monochrome.

4. A finder for cameras comprising a plurality of lenses, one of which is a liquid-lens adapted to cause the object to be seen in monochrome and also to indicate the relation of the position of the finder to the horizontal plane.

5. A finder for cameras comprising a plurality of lenses, one of which is a colored lens adapted to cause the object to be seen in monochrome.

6. The combination with a finder for cameras, of a means adapted to cause the object to be seen in monochrome and also to indicate the relation of the position of the finder to the horizontal plane.

7. In a finder for cameras, the combination with an object-lens, of a viewing-lens, and means for reversing the image produced by the object-lens, one of the lenses adapted to cause the image to appear in monochrome.

8. In a finder for cameras, the combination with an object-lens, of a viewing-lens, and means for reversing the image produced by the object-lens, one of the lenses being adapted to cause the image to appear in monochrome and also to indicate the relation of the position of the finder to the horizontal plane.

9. The combination with an object-lens, of a viewing-lens, and means for reversing the image produced by the object-lens, one of the lenses being a liquid-lens and adapted to cause the image to appear in monochrome.

10. The combination with an object-lens, of a viewing-lens, and means for reversing the image produced by the object-lens, one of the lenses being a liquid-lens adapted to cause the image to appear in monochrome, and also to indicate the relation of the position of the finder to the horizontal plane.

11. In a finder for cameras, the combination with a casing, of a plurality of lenses, a reflecting means for reversing the image produced by one of the lenses, one of the lenses being a liquid-lens located in the horizontal plane and adapted to indicate the relation of the position of the finder to said plane and also to act as a ray-screen for causing the image to appear in monochrome.

In witness whereof I have hereunto set my hand, in the presence of two subscribing witnesses, at New York, in the county of New York and State of New York, this 9th day of May, 1904.

ADOLF O. GRAF.

In presence of -
   H. C. Prado,
   O. C. Ular.